(12) United States Patent  
Milanfar et al.

(10) Patent No.: US 9,253,375 B2  
(45) Date of Patent: Feb. 2, 2016

(54) CAMERA OBSTRUCTION DETECTION

(71) Applicant: Google Inc., Mountain View, CA (US)

(72) Inventors: Peyman Milanfar, Mountain View, CA (US); Marc Stewart Levoy, Mountain View, CA (US); Samuel William Hasinoff, Mountain View, CA (US); Changyin Zhou, Mountain View, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/855,054

(22) Filed: Apr. 2, 2013

(65) Prior Publication Data

US 2014/0293079 A1     Oct. 2, 2014

(51) Int. Cl.
*H04N 5/217* (2011.01)
*H04N 5/232* (2006.01)

(52) U.S. Cl.
CPC .......... *H04N 5/2171* (2013.01); *H04N 5/23222* (2013.01)

(58) Field of Classification Search
CPC .................................................. H04N 5/23222
USPC ................................. 348/169, 208.14, 222.1
See application file for complete search history.

(56) References Cited

U.S. PATENT DOCUMENTS

| 6,047,082 | A | 4/2000 | Rhody et al. | |
|---|---|---|---|---|
| 7,810,511 | B2 * | 10/2010 | Fagrenius et al. | 134/44 |
| 8,208,043 | B2 | 6/2012 | Deng | |
| 2002/0024609 | A1 * | 2/2002 | Matsushima | 348/362 |
| 2006/0098104 | A1 * | 5/2006 | Fujii et al. | 348/222.1 |
| 2006/0268180 | A1 * | 11/2006 | Chou | 348/673 |
| 2008/0246860 | A1 * | 10/2008 | Kusama | 348/241 |
| 2010/0002103 | A1 * | 1/2010 | Shintani | 348/251 |
| 2010/0073492 | A1 * | 3/2010 | Kudo | 348/208.1 |
| 2010/0272314 | A1 | 10/2010 | Cournoyer | |
| 2011/0080494 | A1 | 4/2011 | Mori | |
| 2012/0147182 | A1 | 6/2012 | Meyer | |
| 2012/0206613 | A1 * | 8/2012 | Yoshida | 348/207.1 |

FOREIGN PATENT DOCUMENTS

| GB | 2411955 | 9/2005 |
|---|---|---|
| WO | 2012/115594 | 8/2012 |

OTHER PUBLICATIONS

International Search Report and Written Opinion for corresponding PCT application No. PCT/US2014/032459 dated Aug. 14, 2014.
International Preliminary Report on Patentability for corresponding PCT application No. PCT/US2014-032459, dated Oct. 6, 2015.

* cited by examiner

*Primary Examiner* — Usman Khan
(74) *Attorney, Agent, or Firm* — McDonnell Boehnen Hulbert & Berghoff LLP

(57) ABSTRACT

The present disclosure provides example methods operable by computing device. An example method can include receiving an image from a camera. The method can also include comparing one or more parameters of the image with one or more control parameters, where the one or more control parameters comprise information indicative of an image from a substantially unobstructed camera. Based on the comparison, the method can also include determining a score between the one or more parameters of the image and the one or more control parameters. The method can also include accumulating, by a computing device, a count of a number of times the determined score image exceeds a first threshold. Based on the count exceeding a second threshold, the method can also include determining that the camera is at least partially obstructed.

18 Claims, 7 Drawing Sheets

CAMERA OBSTRUCTION DETECTION

BACKGROUND

Unless otherwise indicated herein, the materials described in this section are not prior art to the claims in this application and are not admitted to be prior art by inclusion in this section.

Mobile devices, such as smartphones and tablets, are providing progressively better cameras that capture higher-quality digital images. Further, stand-alone compact cameras, digital SLR cameras, and mirrorless interchangeable-lens cameras, are becoming more popular. Thus, the amount of high-quality images being captured is increasing rapidly. However, images are often captured by devices that are obstructed by dirt, grease or other foreign objects. Despite the progression in image capture technology, images captured with an obstructed camera may be poor in quality.

SUMMARY

In one aspect, a method is described. The method can include receiving an image from a camera. The method can also include comparing one or more parameters of the image with one or more control parameters, where the control parameters include information indicative of an image from a substantially unobstructed camera. Based on the comparison, the method can also include determining a score between the one or more parameters of the image and the one or more control parameters. The method can also include accumulating, by a computing device, a count of a number of times the determined score exceeds a first threshold. Based on the count exceeding a second threshold, the method can also include determining that the camera is at least partially obstructed.

In another aspect, another method is described. The method can include determining a first condition of a view of a camera on a computing device, where the first condition is indicative of an at least partially obstructed view. The method can also include providing an indicator for display on the computing device, where the indicator is indicative of the first condition. The method can also include providing instructions for removing the indicator based on a determination that the view of the camera is a second condition, where the second condition is a substantially unobstructed view.

In yet another aspect, a non-transitory computer readable memory having stored therein instructions executable by a computing device to cause the computing device to perform functions is described. The functions can include comparing one or more parameters of the image with one or more control parameters, where the control parameters include information indicative of an image from a substantially unobstructed camera. Based on the comparison, the functions can also include determining a score between the one or more parameters of the image and the one or more control parameters. The functions can also include accumulating, by a computing device, a count of a number of times the determined score exceeds a first threshold. Based on the count exceeding a second threshold, the functions can also include determining that the camera is at least partially obstructed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
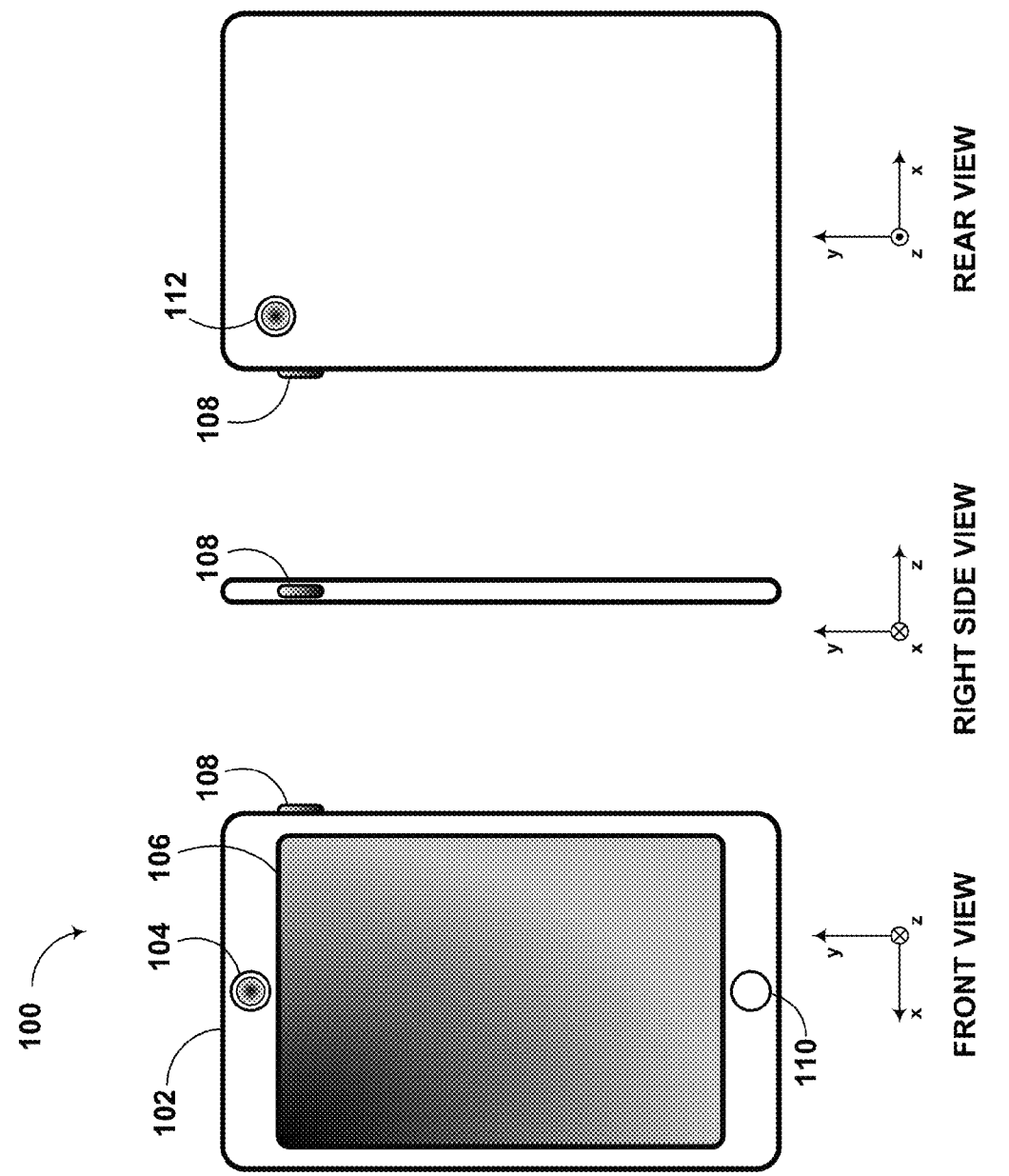
FIG. 1 illustrates the form factor of a digital camera device, in accordance with an example embodiment.

Example methods and systems are described herein. Any embodiment or feature described herein as being an "example" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Image capture devices, such as cameras, are used to capture hundreds of millions of images each day. However, an unfortunately large percentage of these images are captured by a camera that is obstructed by dirt, grease, or other foreign objects. This leads to images that are avoidably hazy (with reduced detail and contrast), demonstrate exaggerated glare, or are otherwise poor in quality.

Within examples, a computing device may be configured to monitor images captured by a camera and compare certain parameters of the captured image with control parameters. The control parameters include aggregate properties of images from a substantially unobstructed camera. One example of a parameter that may be used to compare the one or more parameters captured image with the one or more control parameters may include the minimum color value in a localized spatial region of the image. Another parameter may include a luminance histogram of the image. Yet another parameter may include a histogram of image directional gradients of the image. Yet another parameter may include a point-spread-function of the camera. Each of these parameters have certain properties for images captured by a camera that is substantially unobstructed, and different properties for an image captured by a camera that is at least partially obstructed.

Based on a comparison of the parameters described above, a score may be determined between the one or more parameters of the captured image and the one or more control parameters. The determined score may be compared to a threshold score, and the threshold may be used as a basis for determining whether the captured image was taken with a camera with an at least partially obstructed view. In one example, considering a sequence of scores exceeding the threshold, the computing device may determine that the camera is at least partially obstructed. For instance, if five consecutive images captured by the camera exceed the threshold, the computing device may determine that the camera is at least partially obstructed. In another example, if five out of seven images captured by the camera exceed the threshold, the computing device may determine that the camera is at least partially obstructed. In yet another example, if the computing device determines that the camera is at least partially obstructed, the computing device may provide a notification on the computing device indicating that the camera is at least partially obstructed.

As used herein, obstructed means not free of debris, or having particles on the lens of a camera, or blocking a view of the lens, or having dirt or being dirty, or having moisture accumulated on the lens, or any unnatural or unordinary or undesired condition present on the lens or otherwise impeding the lens of a camera.

It should be understood that the above examples of the method are provided for illustrative purposes, and should not be construed as limiting.

II. Example Image Capture Devices

As cameras become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may provide an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which the shutter blocks light from reaching the recording surface, or an open position, in which light is allowed to reach the recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," may be interpreted as possibly being a shutter length, an exposure time, or any other metric that controls the amount of signal response that results from light reaching the recording surface.

An image capture device or a camera may include devices that can capture still images, devices that can capture video, and devices that can capture both still images and video. A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or other technologies now known or later developed. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 226.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
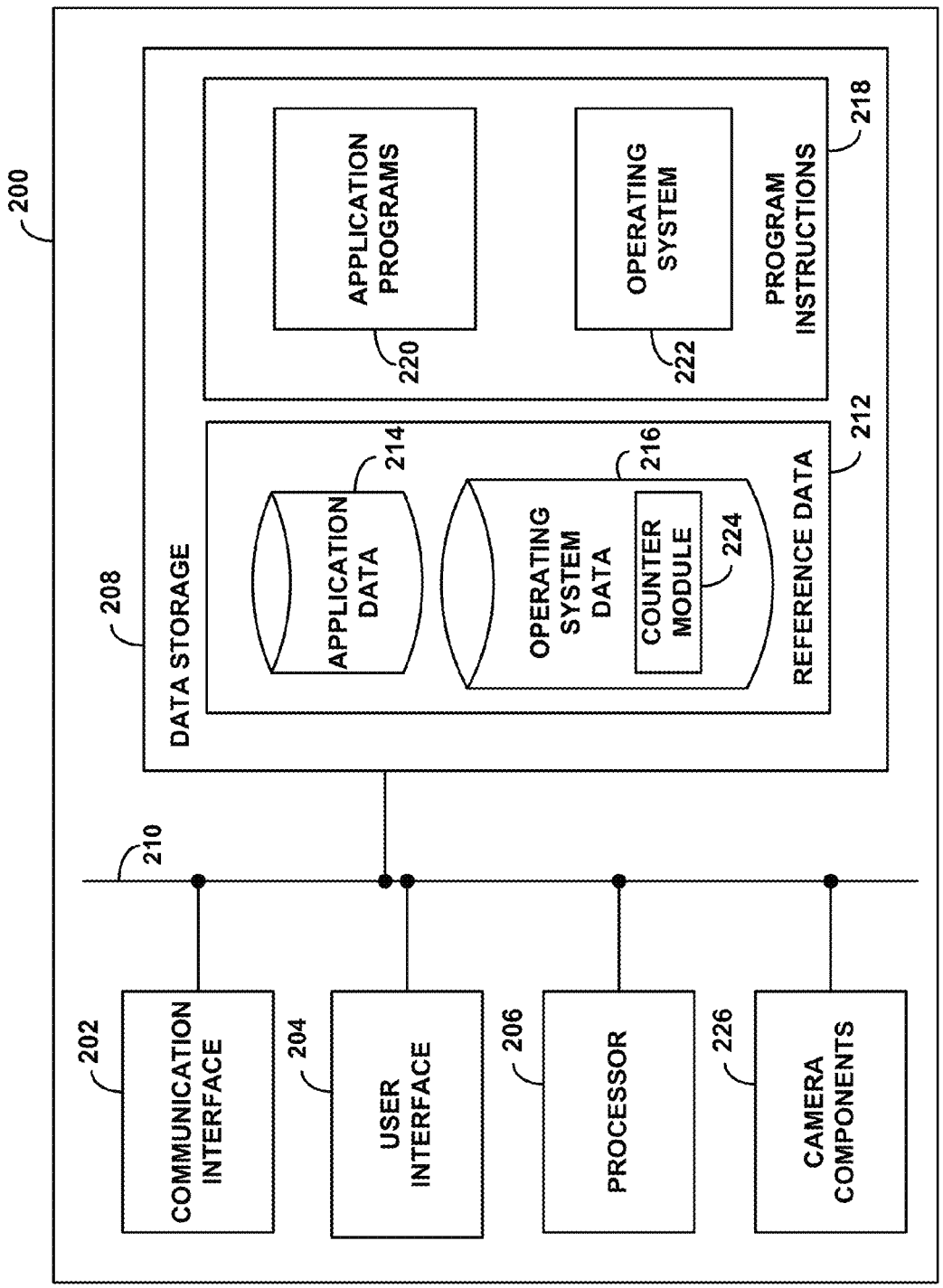
FIG. 2 is a simplified block diagram showing some of the components of an example computing device, in accordance with an example embodiment.

As shown in FIG. 2, computing device 200 may include a communication interface 202, a user interface 204, a processor 206, data storage 208, and camera components 226, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a short range wireless interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities.

Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using reference data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, reference data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

In some examples, the operating system data 216 may include a counter module 224. The counter module 224 may include a counter value indicative of a number of occurrences of a correlation between an input received from the computing device 200 and previously stored inputs. The counter module 224 may be configured to increment the counter value based at least in part on the number of occurrences. In some examples, one or more functions of the computing device 200 may be modified by the counter module 224 when the counter value is less than, or exceeding, a threshold.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some examples, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 226 may include, but are not limited to, an aperture, shutter, recording surface (e.g., photographic film and/or an image sensor), lens, and/or shutter button. Camera components 226 may be controlled at least in part by software executed by processor 206.

III. Examples of Methods

Figure 3:
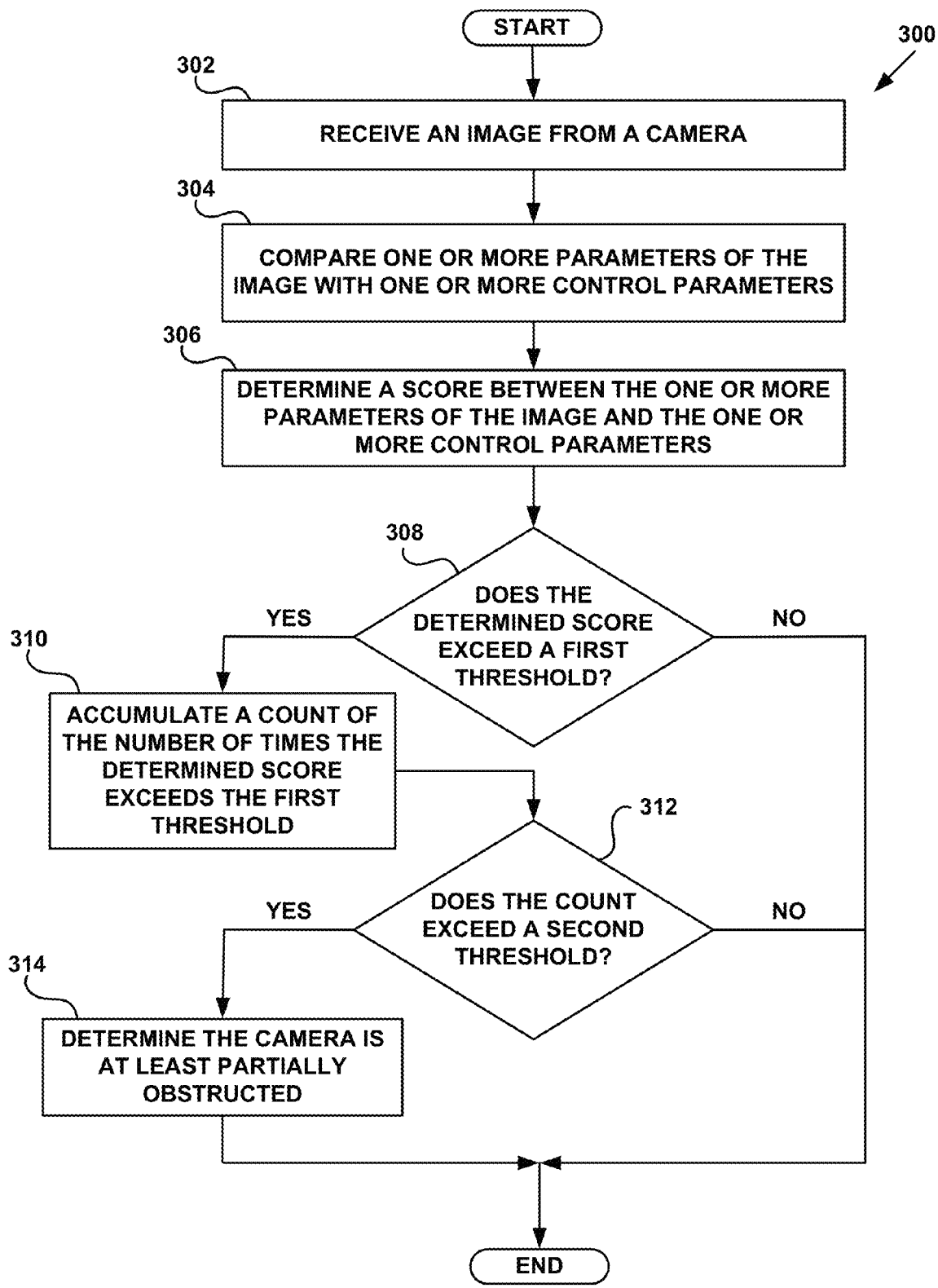
FIG. 3 depicts a flow chart, in accordance with an example embodiment.

FIG. 3 depicts a flowchart of an example method, which in some examples, may be performed by components of the computing device 200 in FIG. 2. Method 300 may include one or more operations, functions, or actions as illustrated by one or more of blocks 302-314. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method shown in FIG. 3 will be described as implemented by a computing device, such as the computing device 200 in FIG. 2. It should be understood that other entities, such as one or more servers, can implement one or more steps of the example method.

At block 302, the method includes receiving an image from a camera. As discussed above, the image from the camera may include a one-dimensional, two-dimensional, or multi-dimensional array of pixel information. Such information may be received by the processor of the computing device, and stored in the data storage. In one embodiment, the computing device may receive the image or information indicative of an image via camera components on the computing device itself. In another embodiment, the computing device may receive the image or information indicative of an image via a wired connection from an image capture device to the computing device (e.g., a USB connection). In yet another embodiment, the computing device may receive the image or information indicative of an image via the internet (e.g., images uploaded to the computing device via "cloud computing"). Other embodiments are possible as well.

At block 304, the method includes comparing one or more parameters of the image with one or more control parameters. The control parameters include aggregate properties of images captured by a substantially unobstructed camera. In one example, the one or more control parameters may be computed in a learning phase. For example, during a setup process the computing device may request a user to clean the lens of a camera located on the computing device, and then take a picture. That picture may then be used to compute the one or more control parameters. In another example, the one or more control parameters may be pre-installed on the computing device. Other embodiments are possible as well.

After the computing device receives the image, the computing device may determine one or more parameters of the image. Further, the computing device may store the same one or more control parameters in its data storage. Once the computing device has determined the one or more parameters of the image, the computing device may then compare those parameters with the matching control parameters. This comparison may be executed by one or more processors of the computing device.

One example of a parameter that may be used when analyzing a given image is the minimum color value in a localized spatial region of the image. Captured digital images may be represented as a one-dimensional, two-dimensional, or multi-dimensional array of pixels. Each pixel may be represented by one or more values that may encode the respective pixel's color and/or brightness. In the YCbCr color model, the Y channel may represent the brightness of a pixel, and the Cb and Cr channels may represent the blue chrominance and red chrominance, respectively, of the pixel.

In one example, the Y channel may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.). The minimum color value of a localized spatial region of a captured image may be determined by minimum Y value for that region.

In another embodiment, a red-green-blue (RGB) color model may be used. In such an example, the minimum color value may be defined as min(R,G,B), that is, the smallest red, green or blue value over each pixel or collection of neighboring pixels. Other embodiments are possible as well.

It is observed that the minimum color value of an image captured by a substantially unobstructed camera is lower than the minimum color value of an image captured by an at least partially obstructed camera. For example, when a camera is obstructed by dirt on the lens of the camera, images appear hazy. In such images, dirt acts as a diffuser and adds to the color value of each pixel of the image, resulting in a higher minimum color value than an image captured by a substantially unobstructed camera.

Another parameter that may be used when analyzing a given image is a luminance histogram of the image. Luminance takes into account the fact that the human eye is more sensitive to green light than red or blue light. In order to produce a luminance histogram, each pixel of an image is converted so that it represents a luminosity based on a weighted average of the green, red, and blue light at that pixel. This weighting assumes that green represents 59% of the perceived luminosity, while the red and blue channels account for just 30% and 11%, respectively. Once all pixels of an image have been converted into luminosity, a luminance histogram may be produced by counting how many pixels are at each luminance. In one embodiment, the luminance histogram of the given image may be determined by one or more processors of the computing device. Other embodiments are possible as well. It is observed that the luminance histogram of an image captured by an at least partially obstructed camera is generally more spread out than that of an image captured by a substantially unobstructed camera.

Yet another parameter that may be used when analyzing a given image is a histogram of image directional gradients of the image. An image directional gradient is a directional change in the intensity or color of an image. An image direction gradient is determined by computing the image derivative in the x and the y directions, and then combining these into a vector. The direction of this vector is the direction in which the image is changing most rapidly, and the magnitude of this vector is the rapidity with which the image is changing and its direction. Once all pixels of an image have been converted into an image direction gradient, a luminance histogram may be produced. In one embodiment, the histogram of image directional gradients of the given image may be determined by one or more processors of the computing device. Other embodiments are possible as well. It is observed that histograms of image directional gradients of an image captured by an at least partially obstructed camera tend to be less radially symmetric than that of an image captured by a substantially unobstructed camera.

Yet another parameter that may be used when analyzing a given image is a point-spread-function of the camera. The point-spread-function (PSF) describes the response of an imaging system to a point source or point object. For example, the PSF may be an expression of the relationship between light intensity or energy and distance from the center of an image of light coming from a theoretically perfect point. This relationship may be shown as a graph plotting distance from center of image and light intensity. In one embodiment, the PSF of the given image may be determined by one or more processors of the computing device. Other embodiments are possible as well. It is observed that the PSF of an at least partially obstructed camera has a long tail, and is sometimes directional as compared to a PSF of a substantially unobstructed camera.

At block 306, the method includes determining a score between the one or more parameters of the image and the one or more control parameters. The computing device may compare one or more parameters of the image with the same one or more control parameters to determine the score. For example, the computing device may compare the minimum color value of the image with the stored control minimum color value, and the luminance histogram of the image with the stored control luminance histogram. In another example, the computing device may only compare the image directional gradients of the image with the stored control image directional gradients. A comparison of any combination of parameters is possible to determine the score. The computing device may then determine the differences between the one or more parameters of the image with the one or more control parameters to determine the score between the image and the control image. In one embodiment, the greater number of differences, the greater the score. For instance, the score may be a number between 0-1, where 1 indicates that the one or more parameters of the image and the same one or more control parameters are completely different, and 0 indicates that that they are identical. Other embodiments are possible as well.

In one embodiment, certain regions of an image may be weighted more heavily when determining the score between the one or more parameters of the image and the one or more control parameters. In one example, more visually salient regions of the image may be weighted more heavily. Visually salient regions are those which tend to attract the attention of human viewers. For example, the edges of an image may be weighted more heavily than the remaining regions of the image. In such an example, a computing device may compare one or more parameters of the edges of an image with one or more control parameters of the edges to determine a raw score. The computing device may then multiply the determined raw score by a weighting coefficient to obtain a first score. The computing device may then compare one or more parameters of the remaining regions of the image with the remaining regions of the one or more control parameters to determine a second score. The final score between the one or more parameters of the image and the one or more control parameters may then be determined by summing the first score and the second score. Other embodiments are possible as well.

At block 308, the method includes determining whether the determined score exceeds a first threshold. The computing device may store the first threshold in its data storage. The computing device may then compare the determined score with the stored first threshold to determine whether the determined score exceeds the first threshold. Continuing with the example described above where the determined score may be between 0-1, the first threshold may be 0.5. In another embodiment, the first threshold may be 0.7. Other examples are possible as well. In one embodiment, a user interface of the computing device may be used to configure the first threshold. In another embodiment, the first threshold is programmed into the hardware of the computing device, and the user may not be able to change the first threshold.

If the determined score exceeds the first threshold, the method continues at block 310 with accumulating a count of the number of times the determined score exceeds the first threshold. The data storage of the computing device may include a counter module. The counter module may include a counter value indicative of the number of times the determined score exceeds the first threshold. The counter module may be configured to increment the counter value based at least in part on the number of times the determined score exceeds the first threshold. In one example, the counter value may be reset to zero any time the determined score does not exceed the first threshold. In another example, the counter value may be reset to zero when two consecutive scores between the image and the control image do not exceed the first threshold. Other embodiments are possible as well.

At block 312, the method includes determining whether the count exceeds a second threshold. The computing device may store the second threshold in its data storage. The computing device may then compare the count with the stored second threshold to determine whether the count exceeds the second threshold. In one example, the second threshold may be 5. In another example, the second threshold may be 10. Other examples are possible as well. In one embodiment, a user interface of the computing device may be used to configure the second threshold. In another embodiment, the second threshold is programmed into the hardware of the computing device, and the user may not be able to change the second threshold.

If the determined count exceeds the second threshold, the method continues at block 314 with determining that the camera is at least partially obstructed. In one embodiment, the method further includes providing a notification that the camera is at least partially obstructed. The notification may be a visual notification or an audio notification, as discussed below.

Figure 4B:
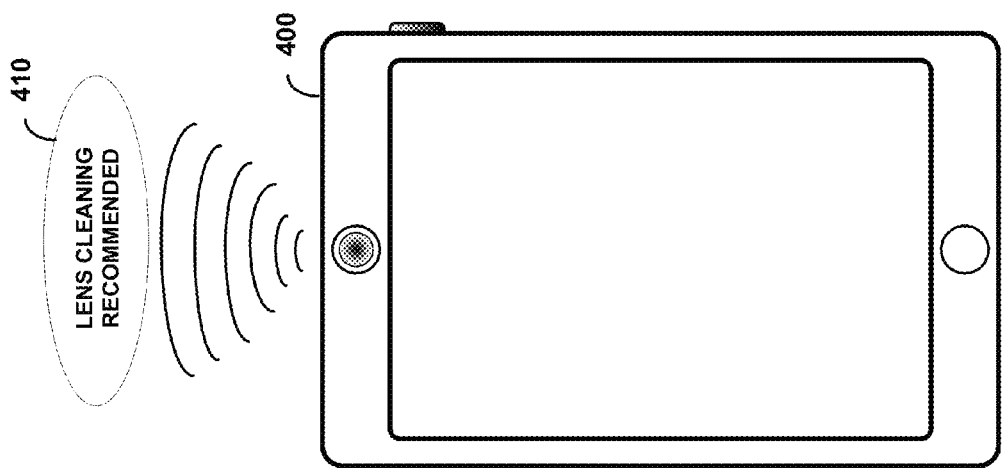
FIGS. 4A-4B illustrate example computing devices performing functions in accordance with an example method.
Figure 4A:
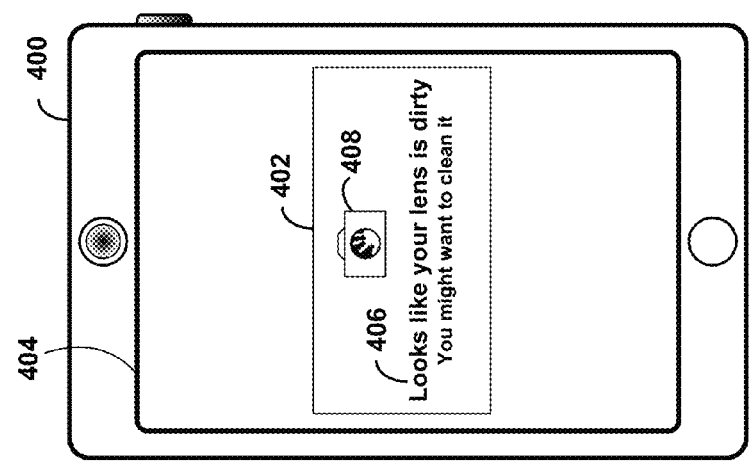

FIGS. 4A-4B illustrate example computing devices performing functions in accordance with an example method. For the illustrated examples, the computing device 400 contains all of the features of the computing device described in FIG. 2. However, it should be understood that the computing device may take other forms and/or may include components different than those illustrated in FIG. 2.

FIG. 4A illustrates a visual notification 402 on the display 404 of a computing device 400. In this example, the visual notification 402 includes a textual notification 406 and a graphical icon 408 indicating that the lens needs cleaning. In another example, only a textual notification may be present. In yet another example, only a graphical icon may be displayed. In FIG. 4A, the textual notification 406 reads "Looks like your lens is dirty" on a first line and "You might want to clean it" on a second line. Other notifications are possible as well. In one example, the visual notification may include a message displayed directly on the display 404 of the computing device 400, as illustrated by the notification 402 in FIG. 4A. In another example, the visual notification may include a Short Message Service (SMS) text message sent to a registered user of the computing device 400. In another example, the notification may include an email sent to a registered user of the computing device 400. In yet another embodiment, the notification may be displayed on a second computing device (e.g., via "cloud computing"). Other examples are possible as well.

Similarly, FIG. 4B illustrates an audio notification 410 generated by the computing device 400. As described above in relation to FIG. 2, the user interface of the computing device may be configured to generate audible output(s), via a speaker, speaker jack, audio output port, audio output device, earphones, and/or other similar devices. In one embodiment, the audio notification may be generated by a second computing device (e.g., via "cloud computing"). In the example in FIG. 4B, the audio notification generated is "Lens Cleaning Recommended." Other audio notifications are possible as well.

Figure 5:
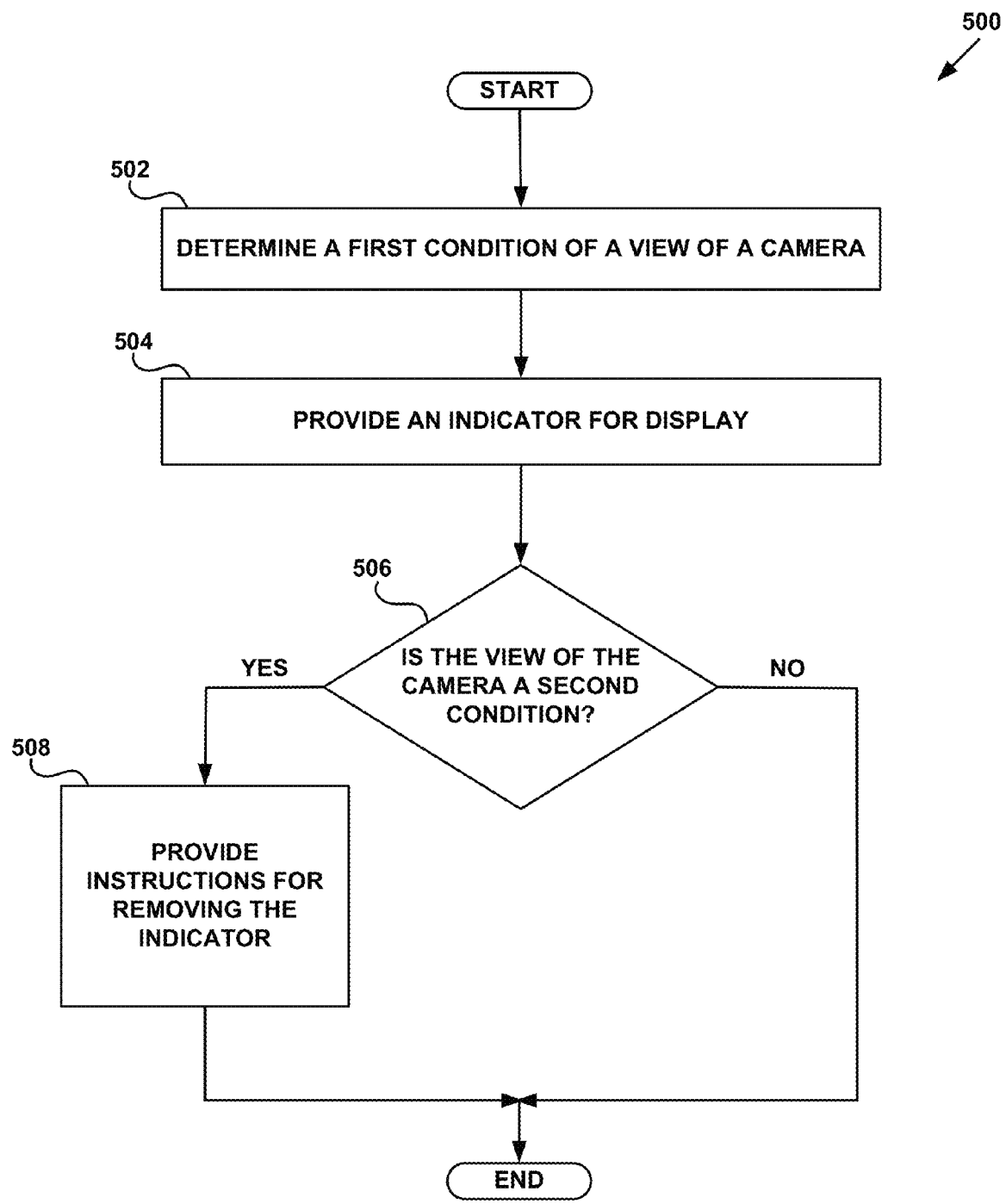
FIG. 5 depicts a flow chart, in accordance with an example embodiment.

FIG. 5 depicts a flowchart of an example method, which in some examples, may be performed by components of the computing device 200 in FIG. 2. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

For the sake of example, the method shown in FIG. 5 will be described as implemented by a computing device, such as the computing device 200 in FIG. 2. It should be understood that other entities, such as one or more servers, can implement one or more steps of the example method.

At block 502, the method includes determining a first condition of a view of a camera on a computing device. In one example, the first condition may be indicative of an at least partially obstructed view. The computing device may determine the first condition of the view of the camera in accordance with the method described above in relation to FIG. 3. In another embodiment, the computing device may determine the first condition of the view of the camera by comparing one or more parameters of a received image with one or more control parameters to determine a score. If the score exceeds a threshold, the computing device may determine the first condition of the view of the camera. Other embodiments are possible as well.

At block 504, the method includes providing an indicator for display on the computing device. In one example, the second condition may be indicative of a substantially unobstructed view. The indicator may be a graphical indicator located on the display of the computing device. In one example, the graphical indicator may flash on the display of the computing device. In another example, the graphical indicator may persist on the display. In another embodiment, the indicator may include a message displayed on the display of the computing device. Other embodiments are possible as well.

At block 506, the method includes determining whether the view of the camera is a second condition. In one embodiment, the computing device may determine the second condition of the view of the camera by comparing one or more parameters of a received image with one or more control parameters to determine a score. If the score does not exceed a threshold, the computing device may determine the second condition of the view of the camera. In another embodiment, the computing device may count the number of times the score does not exceed the threshold, and determine that the view of the camera is a second condition when the count exceeds a second threshold. Other embodiments are possible as well.

If the determined view of the camera is the second condition, the method continues at block 508 with providing instructions for removing the indicator. The instructions may be stored in the program instructions of the computing device and may be executable by the processor.

Figure 6B:
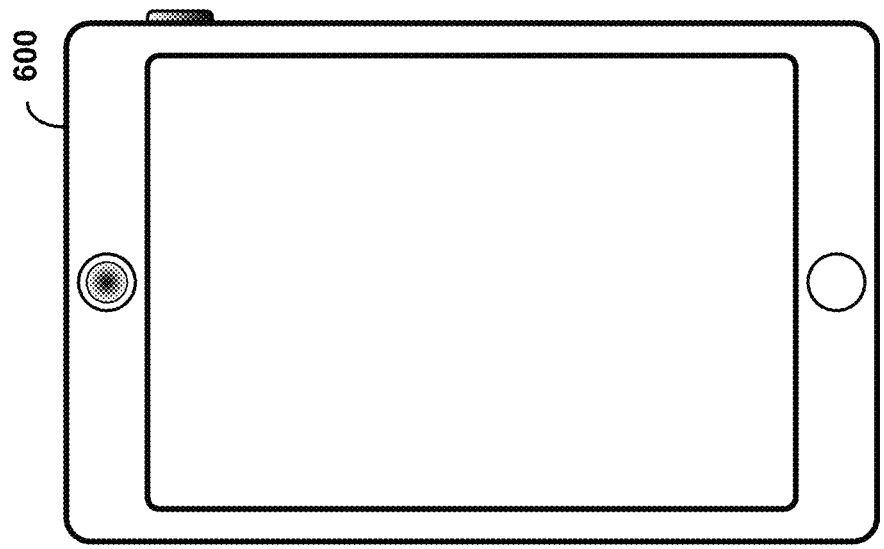
FIGS. 6A-6B illustrate example computing devices performing functions in accordance with an example method.
Figure 6A:
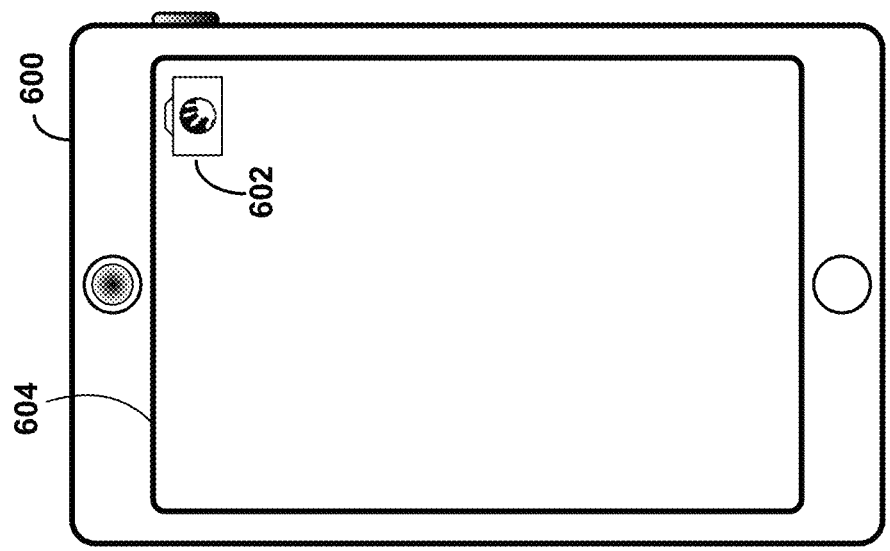

FIGS. 6A-6B illustrate example computing devices performing functions in accordance with an example method. For the illustrated examples, the computing device 600 contains all of the features of the computing device described in FIG. 2. However, it should be understood that the computing device may take other forms and/or may include components different than those illustrated in FIG. 2.

FIG. 6A illustrates an example indicator 602 on the display 604 of the computing device 600. The example indicator 602 in FIG. 6A represents a camera with a handprint smudge, indicating that the camera needs cleaning. Other possible graphical indicators are possible as well. In one embodiment, the indicator 602 may flash on the display 604 of the computing device 600. In another embodiment, the indicator 602 may remain on the display until the computing device 600 determines that the view of the camera is substantially unobstructed. Once the computing device 600 determines that the view of the camera is substantially unobstructed, the computing device may provide instructions to remove the indicator, as show in FIG. 6B.

IV. Example Computer-Readable Medium Configured to Detect Camera Obstructions

Figure 7:
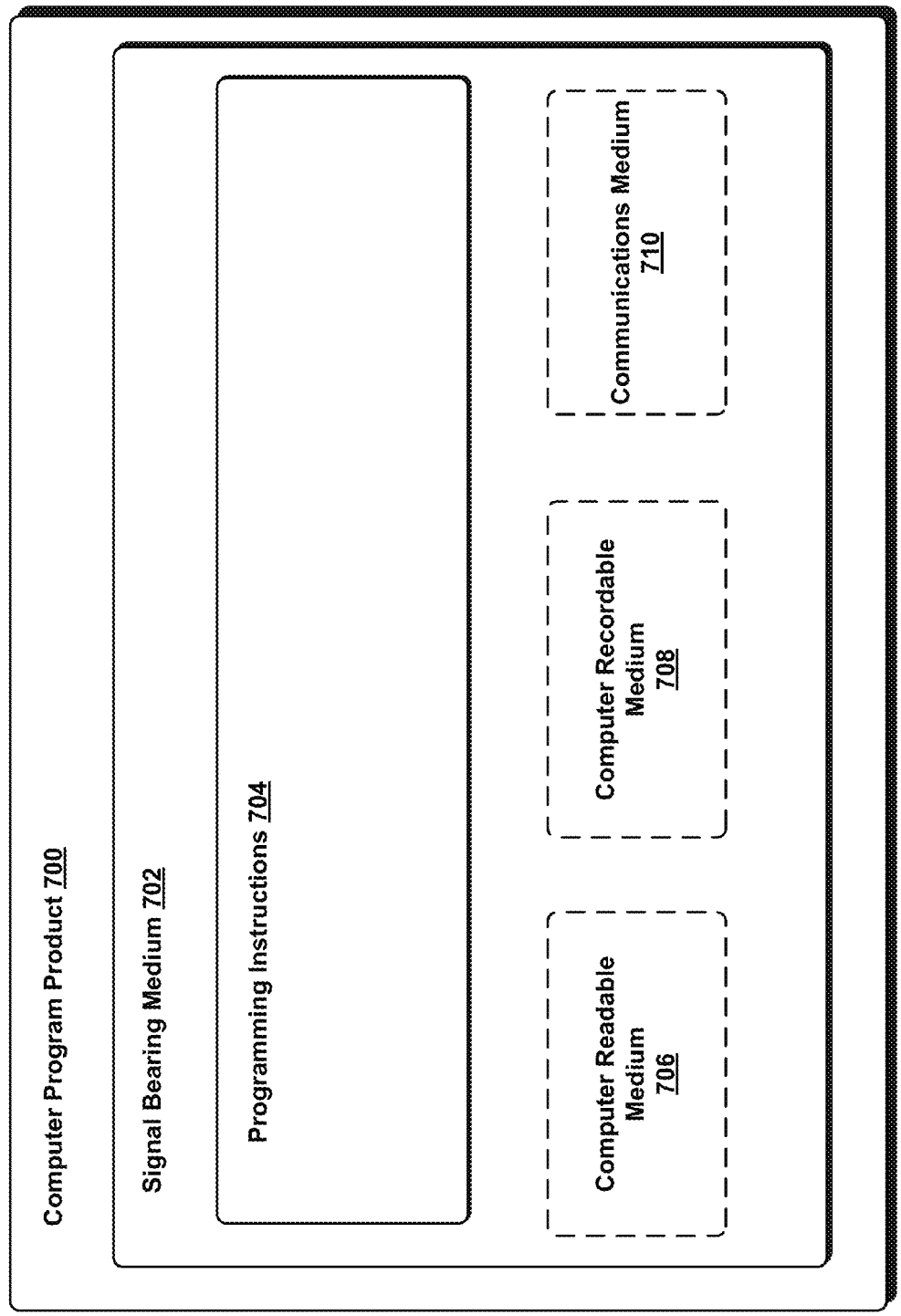
FIG. 7 depicts a computer-readable medium configured according to an example embodiment.

FIG. 7 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor 206 of FIG. 2 is configured to provide various operations, functions, or actions in response to the programming instructions 704 conveyed to the processor 206 by one or more of the computer-readable medium 706, the computer recordable medium 708, and/or the communications medium 710.

The non-transitory computer-readable medium could also be distributed among multiple data storage elements, which could be remotely located from each other. The device that executes some or all of the stored instructions could be a client-side computing device as illustrated in FIGS. 1-2. Alternatively, the device that executes some or all of the stored instructions could be a server-side computing device.

V. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

We claim:

1. A method comprising:
receiving, by a computing device, an image from a camera;
comparing, by the computing device, one or more parameters of the received image with one or more control parameters, wherein the one or more control parameters comprise information indicative of an image from a substantially unobstructed camera;
based on the comparison, determining, by the computing device, a difference score between the one or more parameters of the received image and the one or more control parameters;
accumulating, by the computing device over a plurality of received images, a count of a number of times the determined difference score exceeds a difference score threshold; and
based on the count over the plurality of received images exceeding a count threshold, determining, by the computing device, that the camera is at least partially obstructed due to one or more particles accumulated on a lens of the camera, wherein the count threshold is greater than two.

2. The method of claim 1, further comprising providing, by the computing device, a notification that the camera is at least partially obstructed.

3. The method of claim 2, further comprising providing the notification on a display of the computing device.

4. The method of claim 1, wherein the count of the number of times the determined score exceeds the difference score threshold is based on one or more images previously received by the camera.

5. The method of claim 1, wherein the one or more parameters of the image comprises a luminance histogram of the image.

6. The method of claim 1, wherein the one or more parameters of the image comprises a histogram of image directional gradients of the image, wherein an image directional gradient comprises a directional change in intensity of the image.

7. The method of claim 1, wherein the one or more parameters of the image comprises a minimum color value of the image.

8. The method of claim 1, wherein the one or more parameters of the image comprises a point-spread-function of the camera, wherein the point-spread-function comprises an expression of the relationship between light intensity and distance from the center of a point source.

9. The method of claim 1, wherein determining the score between the one or more parameters of the image and the one or more control parameters comprises:
   comparing, by the computing device, one or more parameters of a first region of the image with one or more control parameters of the first region;
   based on the comparison, determining, by the computing device, a raw score between the one or more parameters of the image and the one or more control parameters;
   applying, by the computing device, a weight coefficient to the raw score to determine a first score;
   comparing, by the computing device, one or more parameters of a second region of the image with one or more control parameters of the second region;
   based on the comparison, determining, by the computing device, a second score between the one or more parameters of the image and the one or more control parameters; and
   summing the first score and the second score.

10. The method of claim 1, further comprising receiving, by the computing device, an input, wherein the input comprises the difference score threshold.

11. The method of claim 1, further comprising receiving, by the computing device, an input, wherein the input comprises the count threshold.

12. A method comprising:
   determining, by a computing device, a first condition of a lens of a camera on the computing device, wherein the first condition is indicative of an at least partially obstructed lens having one or more particles accumulated on the lens of the camera, wherein determining the first condition of the lens of the camera comprises:
      receiving, by the computing device, an image from the camera,
      comparing, by the computing device, one or more parameters of the received image with one or more control parameters, wherein the one or more control parameters comprise information indicative of an image from a substantially unobstructed camera,
      based on the comparison, determining, by the computing device, a difference score between the one or more parameters of the received image and the one or more control parameters,
      accumulating, by the computing device over a plurality of received images, a count of a number of times the determined difference score exceeds a difference score threshold, and
      based on the count over the plurality of received images exceeding a count threshold, determining, by the computing device, the first condition of the lens of the camera;
   providing, by the computing device, an indicator for display on the computing device, wherein the indicator is indicative of the first condition; and
   providing, by the computing device, instructions for removing the indicator based on a determination that the lens of the camera is a second condition, wherein the second condition is a substantially unobstructed lens such that at least one of the one or more particles are no longer positioned on the lens of the camera.

13. The method of claim 12, further comprising receiving, by the computing device, an input, wherein the input comprises the difference score threshold.

14. The method of claim 12, further comprising receiving, by the computing device, an input, wherein the input comprises the count threshold.

15. A non-transitory computer-readable storage medium having stored thereon instructions, that when executed by a computing device, cause the computing device to carry out functions comprising:
   receiving an image from a camera;
   comparing one or more parameters of the received image with one or more control parameters, wherein the one or more control parameters comprise information indicative of an image from a substantially unobstructed camera;
   based on the comparison, determining a difference score between the one or more parameters of the received image and the one or more control parameters;
   accumulating, over a plurality of received images, a count of a number of times the determined score exceeds a difference score threshold; and
   based on the count over the plurality of received images exceeding a count threshold, determining that the camera is at least partially obstructed due to one or more particles accumulated on a lens of the camera, wherein the count threshold is greater than two.

16. The non-transitory computer-readable storage medium of claim 15, wherein the function of determining the score between the one or more parameters of the image and the one or more control parameters comprises:
   comparing one or more parameters of a first region of the image with one or more control parameters of the first region;
   based on the comparison, determining a raw score between the one or more parameters of the image and the one or more control parameters;
   applying a weight coefficient to the raw score to determine a first score;
   comparing one or more parameters of a second region of the image with one or more control parameters of the second region;
   based on the comparison, determining a second score between the one or more parameters of the image and the one or more control parameters; and
   summing the first score and the second score.

17. The non-transitory computer-readable storage medium of claim 15, wherein the functions further comprise providing a notification that the camera is at least partially obstructed.

18. The non-transitory computer-readable storage medium of claim 17, further comprising providing the notification on the computing device.

* * * * *